United States Patent [19]
Masson

[11] 3,985,173
[45] Oct. 12, 1976

[54] VEHICLE TIRE
[75] Inventor: Yves Masson, Paris, France
[73] Assignee: Pneumatiques, Caoutchouc Manufacture et Plastiques Kleber-Colombes, France
[22] Filed: July 11, 1974
[21] Appl. No.: 487,614

[30] Foreign Application Priority Data
July 11, 1973 France .............................. 73.25352

[52] U.S. Cl. .................... 152/361 FP; 152/361 DM
[51] Int. Cl.² .......................................... B60C 9/18
[58] Field of Search ................ 152/354, 357, 361 R, 152/361 DM, 361 FP

[56] References Cited
UNITED STATES PATENTS

| | | |
|---|---|---|
| 3,357,470 | 12/1967 | Massoubre .................... 152/361 FD |
| 3,481,385 | 12/1969 | Depmeyer et al ................ 152/361 R |
| 3,799,233 | 3/1974 | Cappa ............................. 152/361 R |
| 3,881,538 | 5/1975 | Mirtain ........................... 152/361 FP |

Primary Examiner—Drayton E. Hoffman
Attorney, Agent, or Firm—Craig & Antonelli

[57] ABSTRACT

A low profile tire having a reinforcing belt, positioned under the tread of the tire. The belt is made up of at least two superposed layers of cord fabric, the lateral edges of which are folded together. The outer folded edges of one layer are wider than the inner folded edges of another layer so as to completely enclose the edges of the other layer while extending towards the median plane of the tire. The width of these outer folded edges are equal to or less than one quarter of the width of the belt.

11 Claims, 4 Drawing Figures

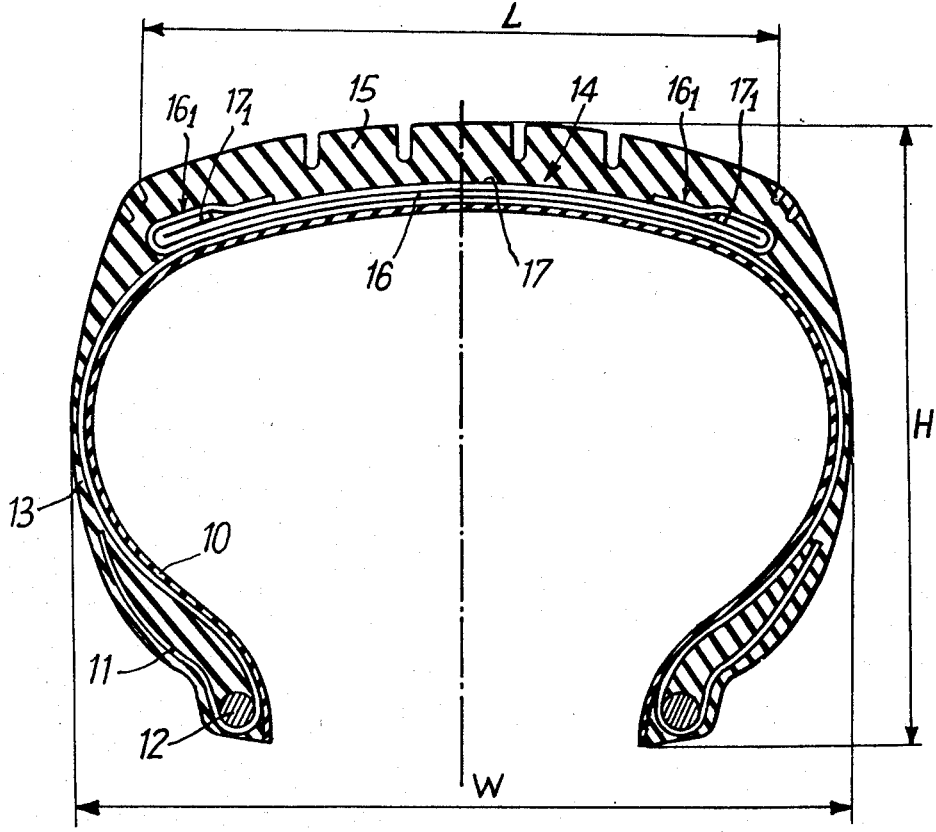
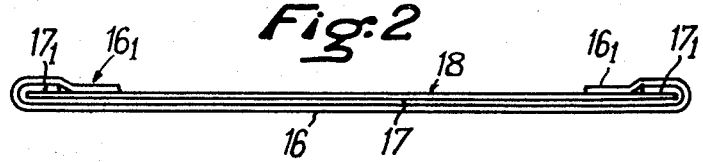
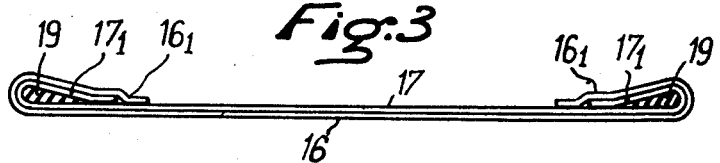
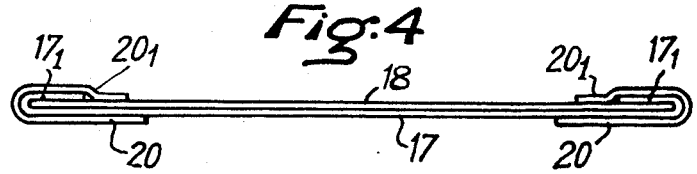

VEHICLE TIRE

BACKGROUND OF THE INVENTION

1. Field of the Invention

The present invention relates to belted tires designed, in particular, for road vehicles capable of travelling at high speeds.

2. Description of the Prior Art

To increase the efficiency of these belted tires and to reduce unsticking of the edges of the belt which tends to occur during intensive use, it was proposed in French Pat. No. 1,253,395, filed on Dec. 31, 1959, to increase the number of layers of reinforcing materials on the edges of the belt, for example, by folding back the edges of certain layers so that they cover the edges of other layers of the belt. It was also proposed to make the belt from at least two superposed layers having the same width, each layer consisting of cord fabric material oriented at a slight angle, the edges of these superposed layers being folded back together.

SUMMARY OF THE INVENTION

The present invention relates to an improvement to this type of belt comprising folded edges, consisting in that the outer folded edges (with respect to the fold) are wider than the inner folded edges so that the outer folded edges completely cover the inner folded edges and overlap towards the median plane of the tire.

The present invention will be described hereinafter in further detail with reference to the accompanying drawings.

BRIEF DESCRIPTION OF THE DRAWINGS

FIG. 1 is a transversal sectional view of a tire comprising a belt with lateral folded and tiered edges, FIGS. 2-4 are transversal sectional views of other constructions of belts of this type.

DESCRIPTION OF THE PREFERRED EMBODIMENTS

The tires, according to the invention and as illustrated in FIG. 1, comprise a radial shell or carcass 10 consisting of one or more layers of "cord" fabric without a weft or with a slight weft and consisting of cords or cables made of spun rayon, nylon, polyester, fiberglass or metal; these cord fabrics have the cords oriented according to the meridian planes of the tire. The edges 11 of the carcass layers are turned-up about the beads 12. This carcass is covered on the sides by side rubber strips 13 and on its top part by a belt 14 which is inextensible in the circumferential direction of the tire. The tire tread 15 bearing an appropriate pattern for the use of the tire is situated on top of the belt.

The shape of the tire illustrated is the shape of a section of the tire in a non-inflated state, that is, the molding shape. It has the characteristic shape of tires with a low profile where the ratio of the height H to the width W is equal to or less than 0.8, with a bearing or contact surface which is substantially flat or slightly convex in the transversal direction. The width L of this bearing surface is at least equal to or larger than the spacing of the beads of the tire mounted on its rim.

In the case of FIG. 1, the belt 14 consists of two superimposed layers 16 and 17 having an unequal evolute width greater than the width 11 of the bearing surface, the lower layer 16 being the wider layer. These two layers consist of parallel cord fabrics having their cords oriented in opposite directions at a slight angle with respect to the equatorial plane so that their directions are crossed. The two layers are centered laterally with respect to the equatorial plane and their lateral edges are folded over together so that the width of the belt is approximately equal to the width L of the bearing surface. Owing to the fold, the folded edges $16_1$ of the inner layer 16 are located outside of the folded edges $17_1$ of the upper layer 17. Because the lower layer 16 is wider than the upper layer 17, the folded edges $16_1$ entirely cover the folded edges $17_1$ and overlap to extend towards the median plane (i.e. the equatorial plane) of the tire. However, the folded edges $17_1$ are preferably terminated quite far from the median plane (i.e. the equatorial plane) so that the central part of the belt is only composed of two superposed layers and remains relatively thin with respect to the lateral parts reinforced by folding the edges $16_1$ and $17_1$. In practice, it is preferable for the width of the folded outer edges $16_1$ to remain equal to or smaller than one quarter of the total width of the belt so that at least the central thin part is equal to at least half the width of the belt. In the case of a tire for a touring vehicle, the width of the folded edges $17_1$ and $16_1$ may be in the order of 10 and 20 mm, respectively. On the one hand, this provides the lateral reinforced parts with sufficient width to give the tire the desired road qualities (course holding capacity, rapid recovery from direction change stresses, good adhesion during turns and comfort) and, on the other hand, it ensures that the end of the inner folded edges $17_1$ are well enclosed. In this way, the belt 14 does not possess, on its outer lateral parts, cut edges which constitute critical points where unsticking would tend to begin during use.

In a variant of the embodiment indicated in FIG. 2, the belt 14 comprises three superposed layers, 16, 17 and 18. The layer 18 is a flat layer with unfolded edges in the folds of the edges $17_1$ of the layer 17, which edges $17_1$ are enclosed in the folds of the wider edges $16_1$ of the layer 16. All the layers can consist of cord material of twisted or cord strands inclined at a slight angle having substantially the same value but preferably orientated in different directions from one layer to the other. Alternatively, the twisted strands of one of these three layers may be oriented according to a substantially transversal direction so as to form a triangular structure with the two other layers.

FIG. 3 shows a belt construction similar to that of FIG. 1 but in which rubber sections 19 are inserted within the folds $17_1$ of the layer 17. These sections 19 further increase the stiffening effect of the edges of the belt which is obtained by folding back the edges $16_1$ and $17_1$. These rubber sections 19 preferably have a very high elasticity modulus, at least in the circumferential direction of the tire, which may be obtained with rubbery mixtures charged with fibers orientated more or less in the longitudinal direction of the sections, i.e. around the tire.

In the case of FIG. 4, the belt comprises a flat layer 18 and the layer 17 with the edges $17_1$ folded about the edges of this flat layer. The lateral parts of this belt are each enclosed by a narrow strip 20 of cord fabric, the folded outer edge $20_1$ of which is wider than the folded edge $17_1$ so as to obtain a tiered effect of the ends of the edges as in the previous cases.

Other belt structures according to the invention may be obtained from the embodiments described above.

All the normal materials may be used to produce these belts, in particular, textile cords (rayon, nylon, polyester, glass, etc.) or metal cords. It is also possible to combine layers consisting of different materials, for example, one layer of metallic material with another layer of textile material. For the textile layers, it is advantageous to use twisted strands or cords having a high modulus of elasticity, that is minimal extension and high mechanical resistance, such as cords made of aromatic polyamides. These layers can also be coated with rubbery mixtures having a high elasticity modulus, for example, 200 kg/cm$^2$ with 100% elongation so as to increase the cohesion of the twisted strands within the layers. In the case of adjacent layers consisting of twisted strands oriented at a slight angle but in opposite directions with respect to the equatorial plane, the angles of these twisted strands may be identical, for example, + and −20° or they may possess slightly different values. For example, the twisted strands of one layer may be orientated at a low angle of +10° to +20° and the twisted strands of the other layer at a slightly greater angle of −20° to −30°; the difference in value being 5° to 10°. This difference in the value of the angles may be employed in particular when combining layers of different twisted materials which do not have the same elasticity modulous or toughness.

To produce one or more of the layers of the belt such as 16, 17 or 18, or the strips 20, it is also possible to use homogeneous or relatively homogeneous rubbery mixtures having very high elasticity moduli in the vulcanized state, that is, their toughness and resistance to extension are much greater than the conventional mixtures currently used in the tire industry. This refers to rubbery mixtures having elasticity moduli greater than 15 kg/cm$^2$ for an elongation of 10%.

Resistances of this order can be obtained by incorporating in the rubbery mixtures, special reinforcing fillers and/or fine textile metal or glass fibers. For example, very fine glass fibers, nylon or cotton fibers having a diameter in the order of 0.03 mm may be incorporated quite easily in the rubber to produce relatively homogeneous mixtures in which the fibers constitute a very fine reinforcing network. In particular, it is possible to use polyolefins having a very high molecular weight, which is equal to or greater than ca. 500,000, such as polyethylene, isotactic polypropylene. The reinforced rubbery mixtures described in applicant's French patent application No. 71.30346 of Aug. 18, 1971, (which corresponds to U.S. application Ser. No. 330,619 filed on Feb. 8, 1973) or in the certificate of addition No. 72.46284 which was attached to this application on Dec. 26, 1972, are particularly suitable for producing the belts according to the present application as these mixtures may have the high elasticity moduli required for its applications.

It also will be appreciated that the rubber sections 19, are produced by a method known per se which is widely employed in the rubber industry. This consists in incorporating rubber fibers and in orienting these fibers in the direction of the main stresses — a direction in which it is desired to obtain the highest modulus of elasticity. To produce these rubber sections, the fibers can be incorporated in the rubber and the mixture of rubber and fibers can then be extruded; the extrusion operation producing the orientation of the fibers. All types of fibers can be used: cotton, nylon, cellulose, glass. Any type of rubber can be employed. For example, this may be natural rubber or SBR (styrene-butadiene copolymer).

While the novel embodiment of the invention have been described, it will be understood that various omissions, modifications and changes in these embodiment may be made by one skilled in the art without departing from the spirit and scope of the invention.

What is claimed is:

1. A tire having a low profile, which comprises a reinforcing belt having a width approximately equal to the width of the bearing surface of the tire and being positioned under the tread of the tire, said belt comprising at least two superposed layers, the lateral edges of which are folded over together towards the median plane of the tire with one layer forming outer folded edges and another layer forming inner folded edges, the outer folded edges of said one layer being wider than the inner folded edges of said another layer so as to completely enclose the folded edges of said another layer and to overlap the inner folded edges of said another layer towards the median plane of the tire to provide a tiered relationship between the ends of the folded over edges and a central thin portion made up of said at least two superposed layers and positioned between said outer folded edges, the width of these outer folded edges being not more than one quarter of the width of the belt, and the central thin portion being at least one half the width of said belt.

2. A tire according to claim 1, wherein the belt comprises two superposed layers having an evolute width greater than the width of the bearing surface of the tire, the lower layer being wider than the upper layer so that the folded edges of the lower layer completely enclose the folded edges of the upper layer.

3. A tire according to claim 1, wherein a hard rubber section is inserted between the inner folded edges and a portion of said another layer adjacent to said inner folded edges.

4. A tire according to claim 1, wherein the reinforcing belt is made up of three superposed layers, two radially inner layers having decreasing evolute widths which are greater than the width of the bearing surface of the tire and greater than the width of a radially outer layer, said radially outer layer being flat and free of folded edges and said two radially inner layers having their edges folded over said radially outer layer with their ends in overlapping and tiered relationship.

5. A tire according to claim 1, wherein the layers are made of cord fabric.

6. A tire according to claim 5, wherein at least one of the layers is made of textile cord fabric and at least one of the other layers is made of metal cord fabrics.

7. A tire according to claim 1, wherein the central portion is made up of two superposed layers.

8. A tire according to claim 1 wherein the central portion of the belt is made up of three superposed layers.

9. A tire according to claim 1, wherein the width of the outer folded edges is equal to one quarter of the width of the belt.

10. A tire according to claim 1, wherein the width of the outer folded edges is less than one quarter of the width of the belt.

11. A tire having a low profile which comprises a reinforcing belt having a width approximately equal to the width of the bearing surface of the tire and being positioned under the tread of the tire, said belt comprising two superposed layers, the lateral edges of one layer being folded about the lateral edges of the other layer towards the median plane of the tire, the one layer having a width which is greater than the width of the bearing surface of the tire and greater than the width of the other layer, said other layer being flat and free of folded lateral edges, the width of the lateral folded edges of the one layer being not more than one quarter of the width of the belt, and small folded lateral strips of belt material enclosing each of said folded lateral edges of said one layer and overlapping toward the median plane of the tire to provide a tiered relationship between the ends of the lateral strips and the ends of the folded lateral edges of the one layer and a central thin portion made up of said two superposed layers, the outer folded edges of the lateral strips being wider than the folded edges of said one layer and said central portion being positioned between said outer folded edges of the lateral strips and being at least one-half the width of said belt.

* * * * *